(12) United States Patent
Alberti et al.

(10) Patent No.: US 8,245,668 B1
(45) Date of Patent: Aug. 21, 2012

(54) FURNITURE PET DETERRENT APPARATUS

(76) Inventors: Gordon R. Alberti, Merritt Island, FL (US); Kathryn L. Alberti, Merritt Island, FL (US); Nancy C. Alberti, Merritt Island, FL (US)

( * ) Notice: Subject to any disclaimer, the term of this patent is extended or adjusted under 35 U.S.C. 154(b) by 0 days.

(21) Appl. No.: 13/439,814

(22) Filed: Apr. 4, 2012

(51) Int. Cl.
*A01K 15/02* (2006.01)
*A47C 7/62* (2006.01)
*A47C 31/00* (2006.01)

(52) U.S. Cl. ............... 119/712; 297/184.11; 297/228.12

(58) Field of Classification Search .................. 119/712, 119/28.5; 297/184.11, 219.1, 228.1, 228.12, 297/229

See application file for complete search history.

(56) References Cited

U.S. PATENT DOCUMENTS

| | | | | |
|---|---|---|---|---|
| 4,998,311 A | * | 3/1991 | Ernst | .................................. 5/654 |
| 5,375,552 A | * | 12/1994 | Scott | .............................. 114/363 |
| 5,592,901 A | * | 1/1997 | Birmingham | .................. 119/706 |
| 5,702,791 A | * | 12/1997 | Zegeer | .............................. 428/53 |
| 5,842,746 A | * | 12/1998 | Rogers | ....................... 297/463.2 |
| 6,367,423 B1 | * | 4/2002 | Scheuer | ......................... 119/706 |
| 6,749,922 B1 | * | 6/2004 | Waselewski | .................. 428/121 |
| 6,827,407 B2 | * | 12/2004 | Niederman et al. | ..... 297/440.14 |
| 7,690,725 B1 | * | 4/2010 | Rawlings | ...................... 297/229 |

* cited by examiner

*Primary Examiner* — Yvonne Abbott
(74) *Attorney, Agent, or Firm* — G. F. Gallinger

(57) ABSTRACT

An apparatus to deter pets from lying on a seat portion which extends between opposite arms each on an end of a piece of furniture comprising: i) a large spring having an extended length sufficient to extend across a width of the seat portion of the piece of furniture, the spring having a sufficient diameter to extend across a substantial depth of the seat portion; ii) a fabric sleeve loosely surrounding the large spring, the sleeve also having a length sufficient to extend across a width of the seat portion of the furniture; iii) two end panels, each attached to an opposite end portion of the large spring and an end portion of the fabric sleeve; and, iv) end panel attachment mechanism spaced around a periphery of the end panels to attach the end panels together in a storage position with the spring compressed therebetween.

12 Claims, 1 Drawing Sheet

FURNITURE PET DETERRENT APPARATUS

FIELD OF THE INVENTION

This invention relates to pets sleeping on furniture. More particularly this invention relates to a lightweight collapsible apparatus which can be conveniently and inconspicuously stored under furniture, and quickly expanded to an operative position for positioning on the furniture, thereby preventing pets from sleeping thereon.

BACKGROUND OF THE INVENTION

Pets seem to prefer sleeping on sofas and other furniture even when they have an equally soft bed on the floor. It is necessary to keep the animals off upholstered furniture, because if this is not done there soon is a dirty hairy spot on the furniture which corresponds to the animal's preferred position thereon. It is much more difficult and expensive to clean the upholstered furniture than wash a dog bed. And it is much more expensive to frequently replace a set of furniture than to keep a dog off his favored position thereon.

It is not simply teaching them not to lie on the sofa. Dogs frequently know they are not supposed to be on the furniture, and accordingly jump off when they hear someone coming. The easiest, and probably the only effective way to keep an animal off the furniture is to cover the furniture with wooden chairs, or other objects so that they cannot lie on the furniture when the room is unoccupied. The problem with covering the furniture is that it is time consuming and inconvenient. What is needed is a lightweight apparatus that can be conveniently and inconspicuously stored, and which can be quickly positioned on the furniture to thereby prevent the animal from lying thereon.

OBJECTS OF THE INVENTION

It is an object of this invention to disclose an apparatus which deters pets from lying on furniture when a room is unoccupied. It is an object of this invention to disclose an apparatus which is easily collapsed and which can be conveniently and inconspicuously stored under furniture. It is yet a further object of this invention to disclose a lightweight apparatus which can be quickly positioned and expanded on furniture. It is yet a further object of this invention to prevent pets from lying on furniture in a way which is safe, and cannot harm the pet. It is a final object of this invention to maintain the clean and unworn appearance of upholstered furniture, and thereby greatly expand the life of that furniture in rooms inhabited by pets.

One aspect of this invention provides for an apparatus to deter pets from lying on a seat portion which extends between opposite arms each on an end of a piece of furniture comprising: i) a large spring having an extended length sufficient to extend across a width of the seat portion of the piece of furniture, said spring having a sufficient diameter to extend across a substantial depth of the seat portion; ii) a fabric sleeve loosely surrounding the large spring, said sleeve also having a length sufficient to extend across a width of the seat portion of the furniture; iii) two end panels, each attached to an opposite end portion of the large spring and an end portion of the fabric sleeve; and, iv) end panel attachment means spaced around a periphery of the end panels to attach the end panels together in a storage position with the spring compressed therebetween. Operatively the apparatus extends across the seat portion between the arms of the piece of furniture thereby preventing pets from lying on the seat portion; and, when not in use, the end panels can be attached together with the fabric covered spring compressed therebetween so that the entire apparatus can be stored inconspicuously beneath the piece of furniture.

In a preferred aspect of this invention the end panels have a generally circular shape with a flat bottom edge portion to prevent rolling on the seat portion of the piece of furniture. If the end panels extend substantially beneath the spring then each panel extending portion may be operatively positioned between the arm and the seat portion of the piece of furniture thereby maintaining the end panels in close juxtaposition to the arms of the piece of furniture, to thereby ensure that said apparatus is maintained in a fully extended position across the width of the seat portion.

A method of preventing pets from lying on a piece of furniture comprising the steps of: a) obtaining an apparatus as above; b) removing the apparatus from a storage position on the floor beneath the piece of furniture; c) seating the apparatus on the seat portion of the piece of furniture with the flat portion of the end panels down; d) releasing the end panel attachment means so that the spring decompresses elongating the apparatus; e) inserting a bottom portion of one end panel between one arm and the seat portion of the piece of furniture; and then, f) elongating the fabric covered spring until the other end panel is adjacent to the other of the two arms; g) inserting the other end panel bottom portion between the other arm and seat portion of the piece of furniture, thereby maintaining the apparatus in a preferred position on the seat of the piece of furniture. The seat portion of the piece of furniture is then substantially covered thereby preventing a pet from lying thereon.

Various other objects, advantages and features of this invention will become apparent to those skilled in the art from the following description in conjunction with the accompanying drawings.

FIGURES OF THE INVENTION

Figure 1:
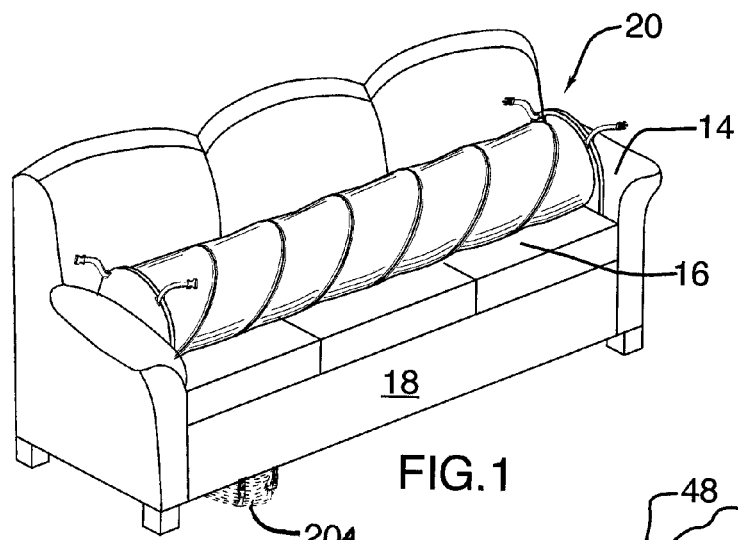
FIG. 1 is a perspective view of a piece of furniture having a furniture pet deterrent apparatus operatively positioned thereon.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have a perspective view of a piece of furniture 18 having a furniture pet deterrent apparatus 20 operatively positioned thereon. Most generally, an apparatus 20 to deter pets from lying on a seat portion 16 which extends between opposite arms 14 each on an end of a piece of furniture 18 comprises: i) a large spring 22 having an extended length sufficient to extend across a width of the seat portion 16 of the piece of furniture 18, said spring 22 having a sufficient diameter to extend across a substantial depth of the seat portion 16; ii) a cylindrical fabric sleeve 24 loosely surrounding the large spring 22, said sleeve 24 also having a length sufficient to extend across a width of the seat portion 16 of the piece of furniture 18; iii) two end panels 26, each attached to an opposite end portion of the large spring 22 and an end portion of the fabric sleeve 24; and, iv) end panel attachment means 30 spaced around a periphery of the end panels 26 to attach the end panels 26 together in a storage position with the spring 22 compressed therebetween. Operatively the apparatus 20 extends across the seat portion 16 between the arms 14 of the piece of furniture 18 thereby preventing pets (not shown) from lying on the seat portion 16; and, when not in use, the end panels 26 can be attached together with the fabric covered spring 22 compressed therebetween so that the entire apparatus 20 can be stored inconspicuously beneath the piece of furniture 18. Within this specification fabric is defined and intended to include not only any type of woven material having threads, but additionally any flexible sheet material which is not technically fabric such as polyethylene or other plastic. Within this specification end panel is intended to not only include a stiff cover for an open end portion of the fabric sleeve but also any full or partial covering of the end of the fabric sleeve which is made from fabric.

Figure 2:
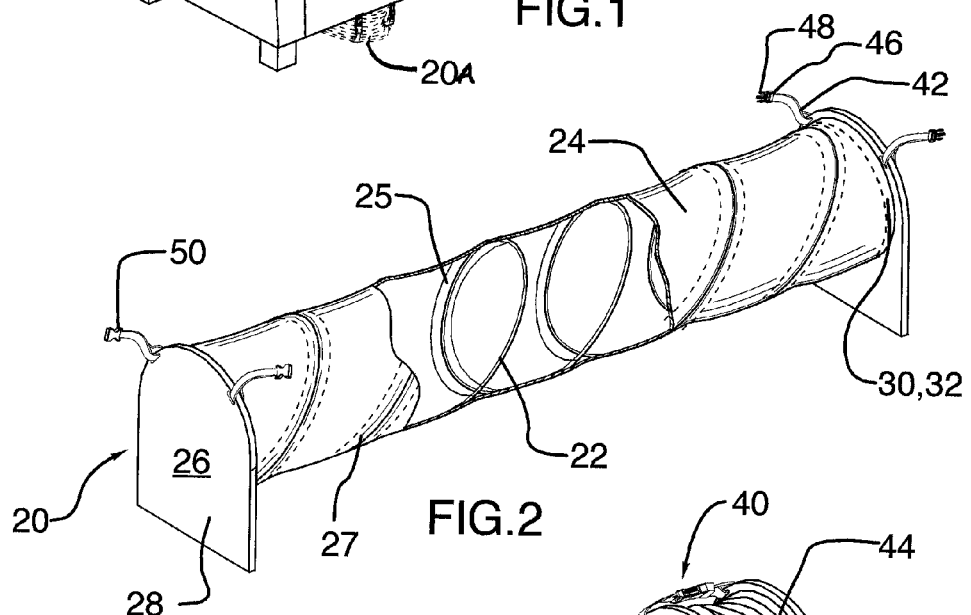
FIG. 2 is an enlarged perspective view of an alternate embodiment of the furniture pet deterrent apparatus shown in FIG. 1. A front central portion of the fabric sleeve is broken away revealing the spring and an inner side portion of the rear central portion of the fabric sleeve.
Figure 3:
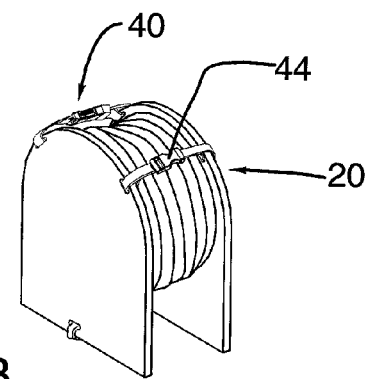
FIG. 3 is a perspective view of the furniture pet deterrent apparatus shown in FIG. 2 in a closed or storage position.

FIG. 2 is a perspective view of an alternate embodiment of the furniture pet deterrent apparatus 20 shown in FIG. 1. A front central portion of the fabric sleeve 24 is broken away revealing the spring 22 and an inner side portion of the rear central portion of the fabric sleeve 24. An alternate embodiment of the invention further comprises a fabric strip 25 spiraling around the cylindrical fabric sleeve 24, having opposite long edges attached to the cylindrical fabric sleeve 24, to thereby form a spiral pocket 27 between the fabric strip 25 and the cylindrical fabric sleeve 24, so that the extended spring 22 may be positioned within the spiral pocket 27, thereby assuring uniform decompression and spacing of the extended spring 22 within the cylindrical fabric sleeve 24.

Most preferably the end panels 26 have a generally circular shape with a flat bottom edge portion to prevent rolling on the seat portion 16 of the piece of furniture 18. In the most preferred embodiment of the invention the end panels 26 extend substantially beneath the spring 22 so that each panel extending portion 28 may be operatively positioned between the arm 14 and the seat portion 16 of the piece of furniture 18 thereby maintaining the end panels 26 in close juxtaposition to the arms 14 of the piece of furniture 18, to thereby ensure that said apparatus 20 is maintained in a fully extended position across the width of the seat portion 16.

Most preferably one of the end panels 26 is removably detachable from the cylindrical fabric sleeve 24 and the spring 22 to facilitate insertion of the spring 22 within the cylindrical fabric sleeve 24. In a preferred embodiment of the invention the attachment/detachment means 30 between the end panel 26 and the cylindrical fabric sleeve 24 comprises hook and loop fasteners 32. Both of the end panels 26 may be removably detachable from the cylindrical fabric sleeve 24 and spring 22 to facilitate cleaning.

Most preferably the end panel attachment means 40 comprises a strap 42 having a quick release plastic strap fasteners 44 of the type wherein a male portion 46 has two engaging hooks 48 which can be disengaged from a female portion 50 when said hooks 48 are squeezed together. The cylindrical fabric sleeve 24 of the apparatus 20 most preferably comprises nylon. Most preferably the apparatus 20 is fabricated in multiple lengths to most efficiently extend across seat portions 16 of pieces of furniture 18 having differing seat portion 16 widths.

A method of preventing pets from lying on a piece of furniture 18 comprising the steps of: a) obtaining an apparatus 20 as above; b) removing the apparatus 20 from a storage position 20A on the floor beneath the piece of furniture 18; c) seating the apparatus 20 on the seat portion 16 of the piece of furniture 18 with the flat portion of the end panels down; d) releasing the end panel attachment means so that the spring decompresses elongating the apparatus 20; e) inserting a bottom portion of one end panel between one arm and the seat portion of the piece of furniture 18; and then, f) elongating the fabric covered spring until the other end panel is adjacent to the other of the two arms; g) inserting the other end panel bottom portion between the other arm and seat portion of the piece of furniture 18, thereby maintaining the apparatus 20 in a preferred position on the seat of the piece of furniture 18. The seat portion of the piece of furniture 18 is then substantially covered thereby preventing a pet from lying thereon.

While the invention has been described with preferred specific embodiments thereof, it will be understood that this description is intended to illustrate and not to limit the scope of the invention, which is defined by the following claims.

We claim:

1. An apparatus to deter pets from lying on a seat portion which extends between opposite arms each on an end of a piece of furniture comprising:
   i) a large spring having an extended length sufficient to extend across a width of the seat portion of the piece of furniture, said spring having a sufficient diameter to extend across a substantial depth of the seat portion;
   ii) a cylindrical fabric sleeve loosely surrounding the large spring, said sleeve also having a length sufficient to extend across a width of the seat portion of the piece of furniture;
   iii) two end panels, each attached to an opposite end portion of the large spring and an end portion of the fabric sleeve;
   iv) end panel attachment means spaced around a periphery of the end panels to attach the end panels together in a storage position with the spring compressed therebetween;
   so that operatively the apparatus extends across the seat portion between the arms of the piece of furniture thereby preventing pets from lying on the seat portion; and, when not in use, the end panels can be attached together with the fabric covered spring compressed therebetween so that the entire apparatus can be stored inconspicuously beneath the piece of furniture.

2. An apparatus as in claim 1 further comprising a fabric strip spiraling around the cylindrical fabric sleeve, having opposite long edges attached to the cylindrical fabric sleeve, to thereby form a spiral pocket between the strip and the cylindrical fabric sleeve, so that the extended spring may be positioned within the spiral pocket, thereby assuring uniform decompression and spacing of the extended spring within the cylindrical fabric sleeve.

3. An apparatus as in claim 1 wherein the end panels have a generally circular shape with a flat bottom edge portion to prevent rolling on the seat portion of the piece of furniture.

4. An apparatus as in claim 3 wherein the end panels extend substantially beneath the spring so that each panel extending portion may be operatively positioned between the arm and the seat portion of the furniture thereby maintaining the end panels in close juxtaposition to the arms of the piece of furniture, to thereby ensure that said apparatus is maintained in a fully extended position across the width of the seat portion.

5. An apparatus as in claim 4 wherein one of the end panels is removably detachable from the cylindrical fabric sleeve and spring to facilitate insertion of the spring within the fabric sleeve.

6. An apparatus as in claim 5 wherein the attachment/detachment means between the end panel and the cylindrical fabric sleeve comprises hook and loop fasteners.

7. An apparatus as in claim 5 wherein both of the end panels are removably detachable from the cylindrical fabric sleeve and spring to facilitate cleaning.

8. An apparatus as in claim 4 wherein the end panel attachment means comprises a strap.

9. An apparatus as in claim 8 further comprising a quick release plastic strap fasteners of the type wherein a male portion has two engaging hooks which can be disengaged from a female portion when said hooks are squeezed together.

10. An apparatus as in claim 1 wherein the fabric comprises nylon.

11. An apparatus as in claim 1 wherein the apparatus is fabricated in multiple lengths to most efficiently extend across seat portions of pieces of furniture having differing seat portion widths.

12. A method of preventing pets from lying on a piece of furniture comprising the steps of:
   a) obtaining an apparatus as described in claim 9;
   b) removing the apparatus from a storage position on the floor beneath the piece of furniture;
   c) seating the apparatus on the seat portion of the furniture with the flat portion of the end panels down;
   d) releasing the end panel attachment means so that the spring decompresses elongating the apparatus;
   e) inserting a bottom portion of one end panel between one arm and the seat portion of the furniture; and then,
   f) elongating the fabric covered spring until the other end panel is adjacent to the other of the two arms;
   g) inserting the other end panel bottom portion between the other arm and seat portion of the piece of furniture, thereby maintaining the apparatus in a preferred position on the seat of the furniture;
   so that the seat portion of the piece of furniture is substantially covered thereby preventing a pet from lying thereon.

\* \* \* \* \*